G. H. POUNDER.
Harrow.
No. 162,306. Patented April 20, 1875.
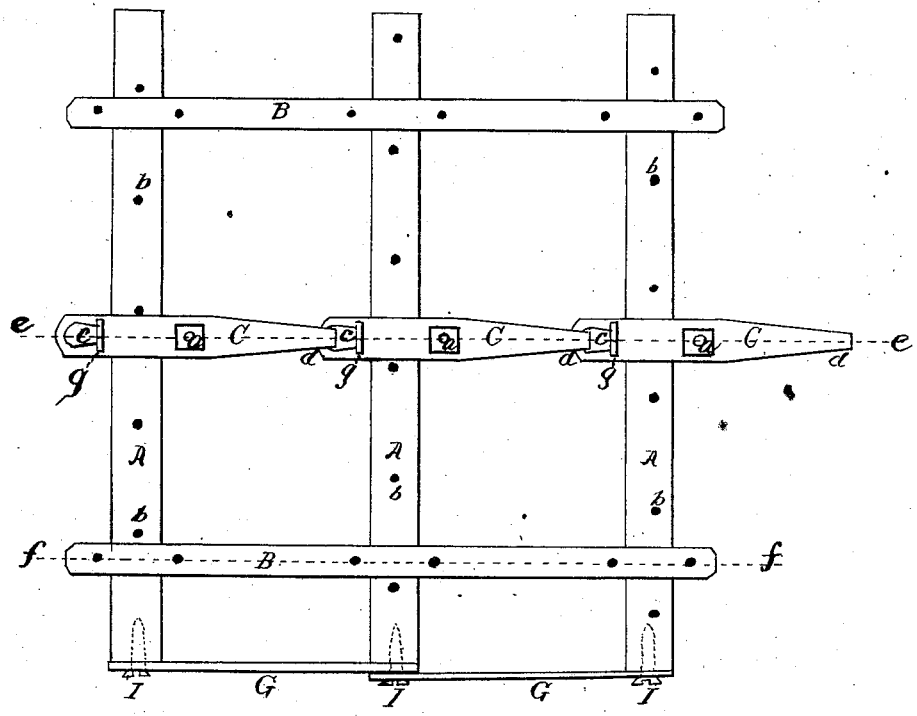
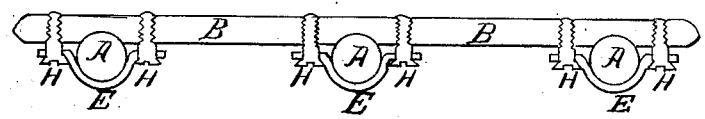
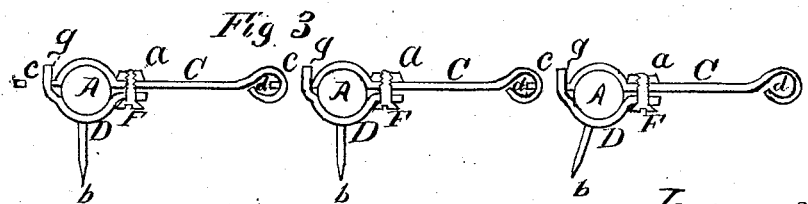

UNITED STATES PATENT OFFICE.

GEORGE H. POUNDER, OF FORT ATKINSON, WISCONSIN.

IMPROVEMENT IN HARROWS.

Specification forming part of Letters Patent No. 162,306, dated April 20, 1875; application filed March 19, 1875.

*To all whom it may concern:*

Be it known that I, GEO. H. POUNDER, of Fort Atkinson, county of Jefferson, State of Wisconsin, have invented an Improvement in Harrows, of which the following is a specification:

The accompanying drawings form a part of this specification, and similar letters of reference indicate like parts in all the figures.

Figure 1 represents a top view with all its parts connected in forming a complete rigid harrow. Fig. 2 is a vertical section of Fig. 1 at dotted line *f*. Fig. 3 is a vertical section at dotted line *e*. Fig. 4 is a perspective view of clasp D.

My invention provides for a ready adjustment of the round parallel bars A in their couplings, for the purpose of changing the angle of teeth *b* forward or backward, each bar A being independent in its adjustment; also, an improved coupling device. It provides for changing from a rigid to a flexible or yielding harrow by means of detaching the bars B B from the bars A. It provides for making the point of draft from the center of each bar A, when bars B are detached, controlling the lateral movement of the ends of bar A by the use of loose couplings attached thereto. It provides also for using round bars A, in which the teeth *b* are fixed, by the use of which they will pass over obstructions more easily, and will allow the clasps E with bars B, and clasps D with plates C, to clamp them at any desired point in their length. It also provides for placing the triangular point *g* of clasp D, and the hooked end *d* of plate C, into one and the same slot, for the purpose of their more simple and cheap manufacture, all of which I now proceed to illustrate more in detail.

The round parallel bars A, Figs. 1 and 2, are coupled together rigidly by bars B, having concave bearings formed upon their lower sides, to fit the top of bars A, on which they rest, and are firmly held by the clasp E and screws H. This harrow might be used in this form: Bars A are also connected by hinged couplings composed of plates C, clasps D, screw-bolts F, and nuts *a*, shown in Figs. 1, 3, and 4. The plates C and clasps D are both curved to fit the round surface of bars A, as shown in Fig. 3. At each end of the curve in plates C is a hole through the plates. The ones nearest to the end of the plates C are of an oval or a slotted form lengthwise the plates. Into these slots *c* the triangular curved ends *g* of clasps D are inserted, until the shoulders which form the triangle *g* are above the plates C. The clasp D is then turned until the holes in clasps D are in line with those in plates C. Through these holes are thrust the bolts F, and by means of the nuts *a* upon them the plates C and clasps D are drawn together, firmly clasping the bars A, as more particularly shown in Fig. 3. The coupling-plates C are connected to each other by placing the hook *d* of one plate into the slot *c* of the other, Figs. 1 and 3.

It will be observed that the hooks *d* and the triangular points *g*, Figs. 1 and 3, in their coupling together occupy the same slot, the result of which is to permanently secure the triangular points *g* of clasps D to plates C, while the hooks *d* are allowed to work loosely in the slots *c*, forming hinged joints. By removing these hinged couplings C and check-bars G from bars A, Fig. 1, nothing would remain but a rigid harrow with the bars A, adjustable by means of clasps E to regulate the angle of the teeth *b*. G G, Fig. 1, are what I have termed check-bars, attached to bars A by means of screws I, one end of each bar G being slotted so as to allow screws I to move in them laterally, giving a certain freedom of movement laterally to bars A, as will be more fully explained hereafter. The slots in bars G have not been deemed necessary to be shown in the drawings. To change the angle of teeth *b*, loosen the screws H, Fig. 2, and nuts *a*, Figs. 1 and 3, turn the bars A in their clasps until the teeth *b* are at the desired angle, then tighten the screws and nuts until the bars A are firmly clasped. It will be evident that by detaching the bars B from bars A, Fig. 1, the harrow will be changed from a rigid to a flexible one, for the purpose of adjusting itself to the uneven surface of the soil. The draft of the team is made direct upon the couplings C, which are clamped to the center of bars A, thereby balancing the pressure upon the teeth, leaving the ends free to yield in any direction. To prevent the ends of the bars A having so much lateral movement as to interfere with each other, I have limited them by means of check-bars G, in which are slots for screws I, and in which they work. The bars A may be coupled at both ends with chains, leaving them a little slack between the bars, which will serve the same purpose. This arrangement relieves the check-bars G or chains from all strain, except an excess of pressure at one end of bars A, which may occur at either side of the couplings C while in operation. By the use of round bars A there are no corners as a hinderance to their passing over obstructions; also, the couplings, be there one, two, or more sets, are readily adjusted upon the bars at any point between the teeth.

Having thus fully explained my invention, what I desire to secure by Letters Patent is—

1. The coupling-plates C, with clasps D, and bolts $a$, in combination with bars A, substantially as described, for the purpose specified.

2. The bars B and clasps E, in combination with round bars A, substantially as described, and for the purpose specified.

3. The parallel bars A, having hinged couplings C at their center, in combination with the check-bars G or their equivalent, substantially as described, for the purpose specified.

4. The hinged plate C with its slot $c$, in combination with the clasp D with its triangular point $g$, substantially as described, for the purpose specified.

5. The round bars A, in combination with bars B, couplings C, clasps D, check-bars G, and bar A, substantially as described, for the purpose specified.

GEORGE H. POUNDER.

Witnesses:
N. F. HOPKINS,
D. B. PECK.